United States Patent [19]

Hayes

[11] 3,998,755

[45] * Dec. 21, 1976

[54] REGENERATION OF A COKE-DEACTIVATED, ACIDIC BIMETALLIC PT-IR CATALYST

[75] Inventor: John C. Hayes, Palatine, Ill.

[73] Assignee: Universal Oil Products Company, Des Plaines, Ill.

[ * ] Notice: The portion of the term of this patent subsequent to Nov. 23, 1988 has been disclaimed.

[22] Filed: May 3, 1974

[21] Appl. No.: 466,754

Related U.S. Application Data

[63] Continuation-in-part of Ser. No. 139,911, May 3, 1971, Pat. No. 3,935,244, which is a continuation-in-part of Ser. No. 844,200, July 23, 1969, Pat. No. 3,622,520, which is a continuation-in-part of Ser. No. 805,380, March 7, 1969, abandoned.

[52] U.S. Cl. ............................... 252/415; 208/140; 252/419

[51] Int. Cl.$^2$ .................. B01J 23/96; C10G 35/08

[58] Field of Search ............ 252/415, 419; 208/140

[56] References Cited

UNITED STATES PATENTS

| | | | |
|---|---|---|---|
| 2,848,377 | 8/1958 | Webb | 208/138 |
| 3,201,355 | 8/1965 | Kimberlin, Jr. et al. | 252/411 R |
| 3,554,902 | 1/1971 | Buss | 208/139 |
| 3,622,520 | 11/1971 | Hayes | 252/415 |
| 3,654,182 | 4/1972 | Hayes | 252/415 |
| 3,764,557 | 10/1973 | Kluksdahl | 252/415 |
| 3,791,961 | 2/1974 | Sinfelt | 208/139 |
| 3,821,105 | 6/1974 | Mitsche et al. | 208/139 |
| 3,835,034 | 9/1974 | Sinfelt et al. | 208/139 |
| 3,839,194 | 10/1974 | Sinfelt et al. | 208/139 |
| 3,867,280 | 2/1975 | Paynter et al. | 208/140 |

Primary Examiner—Winston A. Douglas
Assistant Examiner—P. E. Konopka
Attorney, Agent, or Firm—James R. Hoatson, Jr.; Thomas K. McBride; William H. Page, II

[57] ABSTRACT

A coke-deactivated acidic bimetallic hydrocarbon conversion catalyst, which is a combination of catalytically effective amounts of a platinum or palladium component, an iridium component and a halogen component with a porous carrier material, which is free of labile sulfur and which has been deactivated by a deposition of carbonaceous material thereon during a previous contacting with a hydrocarbon charge stock at hydrocarbon conversion conditions, is regenerated by the sequential steps of: (1) burning carbon from the deactivated catalyst at a relatively low temperature with a substantially sulfur-free first gaseous mixture containing relatively small amounts of oxygen, $H_2O$ and HCl; (2) treating the resulting catalyst at a relatively high temperature with a second gaseous mixture containing $O_2$, $H_2O$ and HCl, (3) purging oxygen from contact with the resulting catalyst; and, (4) reducing the resulting catalyst by contacting it with a substantially sulfur-free third gaseous mixture containing hydrogen and small amounts of $H_2O$ and HCl. Key features of the regeneration method involve: the presence of both $H_2O$ and HCl in the gaseous mixture used in the carbon-burning, oxygen-treating and reduction steps; the use of sulfur-free gaseous mixtures in all of these steps; and the careful control of the mole ratio of $H_2O$ to HCl employed in each of these gaseous mixtures.

11 Claims, No Drawings

3,998,755

REGENERATION OF A COKE-DEACTIVATED, ACIDIC BIMETALLIC PT-IR CATALYST

CROSS-REFERENCES TO RELATED APPLICATIONS

This application is a continuation-in-part of my prior, copending application Ser. No. 139,911 filed May 3, 1971 now U.S. Pat. No. 3,935,244 which in turn is a continuation-in-part of my prior application Ser. No. 844,200 filed July 23, 1969 now U.S. Pat. No. 3,622,520 which in turn is a continuation-in-part of my prior application Ser. No. 805,380 filed Mar. 7, 1969 and now abandoned. All of the teachings of these prior applications are specifically incorporated herein by reference.

The subject of the present invention is a method for regenerating a coke-deactivated, acidic bimetallic hydrocarbon conversion catalyst comprising a combination of catalytically effective amounts of a platinum or palladium component, an iridium component and a halogen component with a porous carrier material. Typically, the catalyst has been deactivated by the deposition of carbonaceous materials thereon during a previous contacting with a hydrocarbon charge stock at an elevated temperature. In essence, the present invention provides a specific sequence of carbon-burning and catalyst-treatment steps which are all conducted with a sulfur-free gas stream containing $H_2O$ and HCl and which are specifically designed to result in a regenerated catalyst possessing activity, selectivity, and stability characteristics which are equivalent to those observed with the fresh, undeactivated catalyst.

Composites having a hydrogenation-dehydrogenation function and a cracking function are widely used today as catalysts in many industries, such as the petroleum or petrochemical industry, to accelerate a wide spectrum of hydrocarbon conversion reactions. Generally, the cracking function is thought to be associated with an acid-acting material of the porous, adsorptive, refractory oxide type which is typically utilized as the support or carrier for a heavy metal component such as one or more of the metals or compounds of the transition metals of Groups IV through VIII of the Periodic Table to which are generally attributed the hydrogenation-dehydrogenation function.

These catalytic composites are used to accelerate a wide variety of hydrocarbon conversion reactions such as hydrocracking, isomerization, dehydrogenation, hydrogenation, desulfurization, cyclization, alkylation, polymerization, cracking, hydroisomerization, etc. In many cases, the commerical applications of these catalysts are in processes where more than one of these reactions are proceeding simultaneously. An example of this latter type of process is reforming wherein a hydrocarbon feed stream containing paraffins and naphthenes is subjected to conditions which promote dehydrogenation of napthenes to aromatics, isomerization of paraffins and naphthenes, dehydrocyclization of paraffins to aromatics, hydrocracking of naphthenes and paraffins and the like reactions, to produce an octanerich and aromatic-rich product stream. Another example is a hydrocracking process wherein catalysts of this type are utilized to effect selective hydrogenation and cracking of high molecular weight unsaturated materials, selective hydrocarcking of high molecular weight materials, and other like reactions, to produce a generally lower boiling, more valuable output stream.

Yet another example is a hydroisomerization process wherein a hydrocarbon fraction which is relatively rich in straight-chain paraffin and/or olefin compounds is contacted with a dual-function catalyst to produce an output stream rich in isoparaffin compounds.

Regardless of the reaction involved or the particular process involved, it is of critical importance that the dual-function catalyst exhibit not only the capability to initially perform the specified functions, but also that it has the capability to perform them satisfactorily for prolonged periods of time. The analytical terms used in the art to measure how well a particular catalyst performs its intended functions in a particular hydrocarbon reaction environment are activity, selectivity and stability. And for purposes of discussion here, these terms are conveniently defined for a given charge stock as follows: (1) activity is a measure of the catalysts's ability to convert hydrocarbon reactants into products at a specified severity level where severity level means the conditions used — that is, the temperature, pressure contact time and presence of diluents such as $H_2$; (2) selectivity refers to the amount of desired product or products obtained relative to the amount of reactants converted or charged; (3) stability refers to the rate of change with time of the activity and selectivity parameters — obviously the smaller rate implying the more stable catalyst. In a reforming process, for example, activity commonly refers to the amount of conversion that takes place for a given charge stock at a specified severity level and is typically measured by octane number of $C_5+$ product stream; selectivity refers to the amount of $C_5+$ yield relative to the amount of the charge stock that is obtained at the particular severity level; and stability is typically equated to the rate of change with time of activity, as measured by octane number of $C_5+$ product and of selectivity as measured by $C_5+$ yield. Actually, the last statement is not strictly correct because generally a continuous reforming process is run to produce a constant octane $C_5+$ product with a severity level being continuously adjusted to attain this result; and, furthermore, the severity level is for this process usually varied by adjusting the conversion temperature in the reaction zone so that, in point of fact, the rate of change of activity finds response in the rate of change of conversion temperature and changes in this last parameter are customarily taken as indicative of the activity stability.

As is well known to those skilled in the art, the principal cause of observed deactivation or instabilitly of these dual-function catalysts, when they are used in a hydrocarbon conversion process, is associated with the formation of coke or carbonaceous materials on the surface of the catalyst during the course of the reaction. More specifically, the conditions utilized in these hydrocarbon conversion processes typically result in the formation of heavy, black, hydrogen deficient, solid or semi-solid carbonaceous material which deposit on the surface and interstices of the catalyst and gradually reduce its activity by shielding its active sites from the reactants. Recently, there has been disclosed a new dual-function bimetallic catalytic composite which possesses improved activity, selectivity and stability characteristics when it is employed in a process for the conversion of hydrocarbons of the type which has heretofore utilized dual-function catalytic composites such as processes for isomerization, hydrogenation, dehydrogenation, alkylation, transalkylation, dealkylation, cyclization, dehydrocyclization, cracking, hydrocracking, reforming, and the like processes. In particular, it has been determined that the use of an acidic, bimetallic catalyst comprising a combination of catalytically effective amounts of a platinum or palladium component, an iridium component, and a halogen component with a porous carrier material can enable the performance of hydrocarbon conversion processes which traditionally have utilized acidic, dual-function, platinum-containing catalysts, to be substantially improved. For example, it has been demonstrated that the overall performance characteristics of a reforming forming process can be sharply improved by the use of this bimetallic catalytic composite. Not unexpectedly, the deactivation of this catalyst occurs in much the same manner as for any other hydrocarbon conversion catalyst having a platinum metal component when it is employed in the hydrocarbon conversion service. Accordingly, the principal mode of deactivation of this bimetallic catalyst is the deposition of coke, nonvolatile hydrocarbons, and other hydrogen-deficient carbonaceous material on the surface and inner pores of the catalyst which eventually cover the catalytically active sites of the catalyst, thereby shielding them from the reactants or blocking access of the reactants to the sites. These deposits cause a gradual decline in activity and selectivity of the catalyst and a gradual loss of its capability to perform its intended function. Depending somewhat on the performance requirements imposed on the process utilizing this catalyst at some point in time the catalyst becomes so loaded or clogged with carbonaceous materials that it either must be regenerated or discarded. Heretofore, substantial difficulty has been encountered in regenerating this acidic, bimetallic hydrocarbon conversion catalyst, More specifically, it has been ascertained that the application of conventional regeneration techniques, which have long been practiced in the art of regenerating dual-function, platinum containing, monometallic hydrocarbon conversion catalyst, has not been successful in restoring the initial activity, selectivity and stability characteristics of this bimetallic catalyst. Typically, attempts at regeneration of this catalyst by a conventional carbon-burning procedure with an oxygen-containing gas have resulted in a regenerated catalyst having an extremely low activity for the conversion of hydrocarbons, and containing a substantially reduced amount of halogen. Attempts at restoring the initial level of halogen contained in the catalyst by well known halogen-adjustment procedures on the regenerated catalyst have been uniformly unsuccessful. Likewise, when the deactivated catalyst also contains a sulfur component, this regeneration problem is greatly magnified and compounded. More specifically, when this recently developed acidic bimetallic catalyst has been exposed to contact with sulfur or sulfur-containing compounds, either because of presulfiding, because of the presence of sulfur in the charge stock, or because of upsets in a treating process used on the charge stock therefor, the response of the resulting sulfur-containing catalyst to a conventional carbon-burning regeneration procedure is completely negative, and the catalyst is thereby permanently deactivated. In other words, this acidic bimetallic catalyst is acutely sensitive to the procedure used to regenerate even when it does not contain sulfur, and when sulfur is present, the already difficult regeneration problem increases by an order of magnitude.

Based upon my recognition of the acute sensitivity of this acidic bimetallic catalyst to the presence of sulfur or sulfur oxides during the course of the regeneration procedure, I have now found that a particularly advantageous method of regeneration involves the substantially complete removal of labile sulfur from this catalyst prior to the burning of carbon therefrom coupled with careful control of the gas streams used in the various steps of the regeneration method to exclude therefrom sulfur, sulfur compounds and sulfur oxides. Moreover, I have discerned that it is particularly beneficial to conduct each of the major steps of the regeneration method with a gas stream containing both $H_2O$ and HCl. More precisely, I have now found a specific sequence of steps which enables the successful regeneration of this recently discovered, acidic, bimetallic catalyst, and essential features of my method are: substantially complete removal of labile sulfur prior to burning of any carbon from the catalyst; careful control of the temperature of the catalyst throughout the regeneration steps; exclusion of sulfur sulfide compounds and sulfur oxides from the gas streams used in all steps; and presence of both $H_2O$ and HCl in the gas streams used in the major steps thereof (i.e., the sulfur stripping step, the carbon-burning step, the oxygen-treatment step, and the final reduction step).

It is, therefore, a principal object of the present invention to provide a method for regenerating an acidic bimetallic hydrocarbon conversion catalyst comprising a combination of catalytically effective amounts of a platinum or palladium component, an iridium component and a halogen component, with a porous carrier material, which catalyst has been deactivated by contact with a hydrocarbon charge stock at elevated temperatures. A corollary object is to provide a solution to the problem of regenerating this bimetallic catalyst when it contains labile sulfur, which solution enables the substantial restoration of the activity, selectivity and stability characteristics of the original catalyst. An overall object is to extend the total catalyst life of these recently developed, acidic bimetallic catalysts and to obtain more efficient and effective use of these catalysts during their active life.

In brief summary, one embodiment of the present invention involves a method for regenerating a deactivated hydrocarbon conversion catalyst comprising a combination of catalytically effective amounts of a platinum or palladium component, an iridium component and a halogen component with a refractory inorganic oxide carrier material, the catalyst having been deactivated by the deposition of carbonaceous material thereon during a previous contacting with a hydrocarbon charge stock at hydrocarbon conversion conditions. Furthermore, the hydrocarbon conversion process in which the catalyst was deactivated, was conducted in a sulfur-free manner so that the deacitivated catalyst is substantially free of labile sulfur. The first step of the regeneration method in this embodiment involves contacting the deactivated catalyst with a substantially sulfur-free first gaseous mixture containing $O_2$, $H_2O$ and HCl at a temperature of about 375°to about 450°C. for a period sufficient to substantially remove the carbonaceous material from the catalyst. In addition, this first gaseous mixture contains $O_2$ in an amount of about 0.2 to about 3 mole % and has a mole ratio of $H_2O$ to HCl selected from the range of about 5:1 to about 100:1. In the next step, the catalyst resulting from the first step is treated with $O_2$ by contacting it with a substantially sulfur-free second gaseous mixture containing $O_2$, HCl and $H_2O$ at a temperature of about 450° to about 550° C. for a period of about 0.5 to about 10 hours. Like the first gaseous mixture, the second mixture also has a mole ratio of $H_2O$ to HCl of about 5:1 to about 100:1; in addition, it contains about 0.2 to about 25 mole % $O_2$, with an amount of about 1 to 5 mole % being preferred. After this oxygen treatment step, oxygen is purged from contact with the resulting treated catalyst; and thereafter, in the final step, the catalyst is contacted with a substantially sulfur-free third gaseous mixture comprising hydrogen, $H_2O$ and HCl at a temperature of about 300° to about 600°C. for a final period of about 0.5 to about 5 hours, thereby producing the regenerated catalyst. Like the first and second gaseous mixtures, this third mixture contains $H_2O$ and HCl; however, in this step the mole ratio of $H_2O$ to HCl is selected from the range of about 5:1 to about 1500:1.

In a second embodiment, the present invention is a method for regenerating a deactivated catalyst comprising a combination of catalytically effective amounts of a platinum or palladium component, an iridium component, a halogen component and a sulfur component with a refractory inorganic oxide carrier material. The catalyst also contains a carbon component which was formed by deposition of carbonaceous material thereon during a previous contacting with a hydrocarbon charge stock at hydrocarbon conversion conditions. The first step of the instant method, in this embodiment, involves contacting the deactivated catalyst with a substatially sulfur-free hydrogen stream at a temperature of about 350° to about 600°C. for a period extending until the resulting effluent gas stream is substantially free of hydrogen sulfide. This hydrogen stream preferably contains $H_2O$ and HCl in amounts selected to result in a mole ratio of $H_2O$ to HCl of about 5:1 to about 100:1. After this first step, hydrogen is purged from contact with the catalyst, and it is subjected to contact with a substantially sulfur-free first gaseous mixture containing $O_2$, $H_2O$ and HCl at a temperature of about 375° to about 450°C. for a period of time sufficient to substantially remove the carbonaceous materials from the catalyst. This first gaseous mixture contains $H_2O$ and HCl in amounts selected to result in a mole ratio of $H_2O$ to HCl of about 5:1 to about 100:1; in addition, the amount of $O_2$ contained therein is about 0.2 to about 3 mole percent thereof. After carbon is substantially removed from the catalyst, it is subjected to a treatment step involving contacting it with a second gaseous mixture for a period of about 0.5 to about 10 hours at a relatively high temperature of about 450° to about 550°C. Like the first mixture, this second mixture contains $H_2O$ and HCl in a mole ratio of 5:1 to about 100:1; in addition, it contains about 0.2 to 25 mole % $O_2$, with an amount of about 1 to about 5 mole % being preferred. Following this oxygen treatment step, oxygen is purged from contact with the catalyst with an inert gas stream. Thereafter, the catalyst is subjected to contact with a substantially sulfur-free third gaseous mixture comprising hydrogen, $H_2O$ and HCl at a temperature of about 300° to about 600°C. for a final period of about 0.5 to about 5 hours. This third gaseous mixture contains $H_2O$ and HCl in amounts sufficient to result in a mole ratio of $H_2O$ to HCl of about 15:1 to about 500:1. The regenerated catalyst recovered from this last step has activity, selectivity and stability characteristics equivalent to those possessed initially by the fresh catalyst.

Some of the advantages associated with this method of catalyst regeneration are: (1) it does not require high concentration of oxygen in the gas stream used during the oxygen-treatment step although high concentrations can be used if desired; (2) since all major steps are performed in the presence of water, expensive dryers and/or elaborate drying procedures are not necessary; (3) fairly low temperatures can be utilized in the reduction step; (4) the presence of chloride in the gas streams utilized in all major steps insures the automatic adjustment of the halogen component of the catalyst to the proper level; and, (5) the positive requirements for exclusion of sulfur from the gas streams utilized in each of these steps, coupled with the initial sulfur-stripping step in the case of the sulfur-containing catalyst, eliminates the possibility of damaging the catalyst due to exposure to sulfur or sulfur oxides.

In another embodiment, the present invention is a regeneration method as summarizesd above in the embodiment first described above wherein the oxygen-treating step comprises the substeps of: (1) treating the catalyst resulting from the carbon-burning step with the first gaseous mixture for about 0.5 to about 5 hours at a temperature of about 450° to about 550°C.; and thereafter, (2) increasing the amount of $O_2$ contained in the first gaseous mixture by a factor of about 1.5 to about 8 and continuing the treating with this modified mixture for an additional period of about 0.5 to about 5 hours at the same temperature.

Yet another embodiment relates to the embodiment of the regeneration method first described above wherein the mole ratios of $H_2O$ to HCl utilized in the carbon-burning step, the oxygen-treatment step and the reduction step are selected from the range of about 10:1 to about 170:1 and wherein the amount of oxygen contained in the first gaseous mixture is about 0.5 to about 1.5 mole percent thereof.

Other objects and embodiments of the present invention encompass further details about the acidic, bimetallic catalysts that is regenerated thereby, the conditions and regents used in each step of the regeneration method, and the mechanics associated with each of these steps. These embodiments and objects are hereinafter disclosed in the following detailed description of each of the essential and preferred steps of the present method.

The acidic bimetallic catalyst that is regenerated by the method of the present invention comprises a porous carrier material or support having combined therewith catalytically effective amounts of a platinum or palladium component, an iridium component and a halogen component. In many cases, it also contains a sulfur component. Considering first the porous carrier material, it is preferred that the material be a porous, adsorptive, high-surface area support having a surface area of about 25 to about 500 m²/g. The porous carrier material should be relatively refractory to the conditions utilized in the hydrocarbon conversion process; suitable carrier materials are: (1) activated carbon, coke or charcoal; (2) silica or silica gel, clays, and silicates including those synthetically prepared and naturally occurring, which may or may not be acid treated, for example, attapulgus clay, china clay, diatomaceous earth, fuller's earth, kaoline, kieselguhr, pumice, etc.; (3) ceramics, porcelain, crushed firebrick, and bauxite; (4) refractory inorganic oxides such as alumina, titanium dioxide, zirconium dioxide, chromium oxide, zinc oxide, magnesia, thoria, boria, silica-alumina, silica-magnesia, chromia-alumina, alumina-bori, silica-zirconia, etc.; (5) zerolitic crystalline aluminosilicates such as naturally occurring or snythetically prepared mordenite and/or faujasite, either in the hydrogen form or in a form which has been treated with multivalent cations; and, (6) combinations of one or more elements from these groups. The preferred porous carrier materials are refractory inorganic oxides, with best reults obtained with an alumina carrier material. Suitable alumina materials are the crystalline aluminas known as the gamma-, eta- and theta-aluminas, with gamma- or eta-alumina giving best results. In addition, in some embodiments the alumina carrier material may contain minor proportions of other well known refractory inorganic oxides such as silica, zirconia, magnesia, etc.; however, the preferred carrier material is substantially pure gamma- or eta-alumina. Prferred carrier materials have an aparent bulk density of about 0.3 to about 0.7 g/cc and surface area characteristics such that the average pore diameter is about 20 to about 300 Angstroms, the pore volume is about 0.1 to about 1 ml/g and the surface area is about 100 to about 500 m²/g. In general, best results are typically obtained with a gamma-alumina carrier material which is used in the form of spherical particles having: a relatively small diameter (i.e., typically about 1/16 inch), an apparent bulk density of about 0.5 g/cc, a pore volume of about 0.4 ml/g, and a surface area of about 175 m²/g.

The preferred alumina carrier material may be prepared in any suitable manner and may be synthetically prepared or natural occurring. Whatever type of alumina is employed it may be activated prior to use by one or more treatments including drying, calcination, steaming, etc., and it may be in a form known as activated alumina, activated alumina of commerce, porous alumina, alumina gel, etc. For example, the alumina carrier material may be prepared by adding a suitale alkaline reagent, such as ammonium hydroxide to a salt of aluminum such as aluminum chloride, aluminum nitrate, etc., in an amount to form an aluminum hydroxide gel which upon drying and calcining is converted to alumina. The alumina may be formed in any desired shape such as spheres, pills, cakes, extrudates, powders, granules, etc., and utilized in any desired size. A particularly preferred form of alumina is the sphere; and alumina spheres may be continuously manufactured by the well known oil drop method which comprises: forming an alumina hydrosol by any of the techniques taught in the art and preferably by reacting aluminum metal with hydrochloric acid, combining the hydrosol with a suitable gelling agent and dropping the reultant mixture into an oil bath maintained at elevated temperatures. The droplets of the mixture remain in the oil bath until they set and from hydrogel spheres. The spheres are then continuously withdrawn from the oil bath and typically subjected to specific aging treatments in oil and an ammoniacal solution to further improve their physical characteristics. The resulting aged and gelled particles are then washed and dried at a relatively low temperature of about 300°to about 400°F. and subjected to a calcination procedure at a temperature of about 850°to about 1300°F. for a period of about 1 to about 20 hours. This treatment effects conversion of the alumina hydrogel to the corresponding cyrstalline gamma-alumina. See the teachings of U.S. Pat. No. 2,620,314 for additional details.

One essential ingredient of the acidic, bimetallic catalytic composite regenerated by the instant method is an iridium component. It is of fundamental importance that substantially all of the iridium component exists within the regenerated catalytic composite produced by the method of the present invention in the elemental metallic state and the subsequently described reduction step of the present method is designed to accomplish this objective. The iridium component may be utilized in the composite in any amount which is catalytically effective, with the preferred amount being about 0.01 to about 2 wt. % thereof, calculated on a carbon-free and an elemental iridium basis. Typically, best results are obtained with about 0.05 to about 1 wt. % iridium. It is, additionally, preferred to select the specific amount of iridium from within this broad weight range as a function of the amount of the platinum or palladium component, on an atomic basis, so that the atomic ratio of iridium to platinum or palladium is about 0.1:1 to about 2:1, with best results achieved in a range corresponding to 0.25:1 to about 1.5:1.

This iridium component may be incorporated into the catalytic composite in any suitable manner known to those skilled in the catalyst formulation art which results in a relatively uniform dispersion of iridium in the carrier material. In addition, it may be added at any stage of the preparation of the composite — either during the preparation of the carrier material or thereafter — and the precise method of incorporation used is not deemed to be cirtical. However, best results are thought to be obtained when the iridium component is rlatively uniformly distributed throughout the carrier material, and the preferred procedures are the ones known to result in a composite having this relatively uniform distribution. One acceptable procedure for incorporating this component into the composite involves cogelling or coprecipitating the iridium component during the preparation of the preferred carrier material, alumina. This procedure usually comprehends he addition of a soluble, decomposable compound of iridium such as iridium tetrachloride to the alumina hydrosol before it is gelled. The resulting mixture is then finished by conventional gelling, aging, drying and calcination steps as explained hereinbefore. A preferred way of incorporating this component is an impregnation step wherein the porous carrier material is impregnated with a suitable iridium-containing solution either before, during or after the carrier material is calcined. Preferred impregnation solutions are aqueous solutions of water soluble, decomposable iridium compound such as iridium tribromide, iridium dichloride, iridium tetrachloride, iridium oxalic acid, iridium sulfate, potassium iridochloride, chloroiridic acid and the like compounds. Best results are ordinarily obtained when the impregnation solution is an aqueous solution of chloroiridic acid or sodium chloroiridate. This component can be added to the carrier material either prior to, simultaneously with or after the other metallic components are combined therewith. Best results are usually achieved when this component is added simultaneously with the other metallic components. In fact, excellent results are obtained with a one step impregnation procedure using an aqueous solution comprising chloroplatinic or chloropalladic acid, chloroiridic acid and hydrochloric acid.

A second essential ingredient of the acidic, bimetallic catalyst which is regenerated by the method of the present invention is the platinum or palladium component. That is, it is intended to cover the use of platinum or palladium or mixtures thereof as a second component of the present composite. It is a feature of the regeneration method of the present invention that substantially all of the platinum or palladium component exists within the final regenerated catalytic composite in the elemental metallic state (i.e. as elemental platinum or palladium). Generally, the amount of the second component used in the composite is relatively small compared to the amount of the other components combined therewith. In fact, the platinum or palladium component generally will comprise about 0.01 to about 2 wt. % of the catalytic composite, calculated on an elemental and carbon-free basis. Excellent results are obtained when the catalyst contains about 0.05 to about 1 wt. % of platinum or palladium metal.

This platinum or palladium component may be incorporated in the catalytic composite in any suitable manner known to result in a relatively uniform distribution of this component in the carrier material such as coprecipition or cogellation, ion-exchange, or impregnation. The preferred method of preparing the catalyst involves the utilization of a soluble, decomposable compound of platinum or palladium to impregnate the carrier material in a relatively uniform manner. For example, this component may be added to the support by commingling the latter with an aqueous solution of chloroplatinic or chloropalladic acid. Other water-soluble compounds of platinum or palladium may be employed in impregnation solutions and include ammonium chloroplatinate, bromoplatinic acid, platinum dichloride, platinum tetrachloride hydrate, platinum dichlorocarbonyl dichloride, dinitrodiamino-platinum, tetrammine platinum chloride, palladium chloride, palladium nitrate, palladium sulfate, etc. The utilization of a platinum or palladium chloride compound, such as chloroplatinic or chloropalladic acid, is generally preferred since it facilitates the incorporation of both the platinum or palladium component and at least a minor quantity of the halogen component in a single step. Hydrogen chloride or the like acid is also generally added to the impregnation solution in order to further facilitate the incorporation of the halogen component and the uniform distribution of the metallic component throughout the carrier material. In addition, it is generally preferred to impregnate the carrier material after it has been calcined in order to minimize the risk of washing away the valuable platinum or palladium compounds; however, in some cases it may be advantageous to impregnate the carrier material when it is in a gelled state.

Another essential constituent of the acidic bimetallic catalyst that is subjected to the method of the present invention is the halogen component. Although the precise form of the chemistry of the association of the halogen component with the carrier material is not entirely known, it is customary in the art to refer to the halogen component as being combined with the carrier material or with the other ingredients of the catalyst in the form of the halide (e.g. chloride or fluoride). This combined halogen may be either fluorine, chlorine, iodine, bromine, or mixtures thereof. Of these, chlorine is particularly preferred. The halogen may be added to the carrier material in any suitable manner either during preparation of the carrier material or before or after the addition of the other components. For example, the halogen may be added at any stage of the preparation of the carrier material or to the calcined carrier material as an aqueous solution of a suitable water-soluble, halogen-containing compound such as hydrogen fluoride, hydrogen chloride, hydrogen bromide, ammonium chloride, etc. The halogen component or a portion thereof may be combined with the carrier material during the impregnation of the latter with the platinum or palladium component; for example, through the utilization of a mixture of chloroplatinic acid, chloroiridic acid and hydrogen chloride. In another situation, the alumina hydrosol which is typically utilized to form the preferred alumina carrier material, may contain halogen and thus contribute at least a portion of the halogen component to the final composite. The halogen component is combined with the carrier material in an amount sufficient to result in a final composite that contains about 0.1 to about 3.5 wt. %, and preferably about 0.5 to about 1.5 wt. % of the halogen, calculated on an elemental and carbon-free basis. The preferred halogen component is combined chloride.

Regardless of the details of how the components of the acidic bimetallic catalyst are combined with the porous carrier material, the final catalyst generally will be dried at temperature of about 200 to about 600°F. for a period of from about 2 to about 24 hours or more, and finally calcined or oxidized at a temperature of about 700° to about 1100°F. in an air atmosphere for a period of about 0.5 to about 10 hours in order to convert the metallic components substantially to the oxide form. Best results are generally obtained when the halogen content of the catalyst is adjusted during this calcination step by including a halogen or a halogen-containing compound such as hydrogen chloride or chlorine in the air atmosphere utilized. In particular, when the halogen component of the catalyst is chlorine, it is preferred to use a mole ratio of $H_2O$ to HCl of about 5:1 to about 100:1 during at least a portion of the calcination step in order to adjust the final chlorine content of the catalyst to a range of about 0.5 to about 1.5 wt. %.

It is preferred that he resultant calcined catalytic composite be subjected to a substantially water-free reduction step prior to its use in the conversion of hydrocarbons. This step is designed to insure a uniform and finely divided dispersion of the metallic components in the form of the corresponding metals. throughout the carrier material. Preferably, a substantially pure and dry hydrogen stream (i.e., less than 20 vol. ppm. $H_2O$) is used as the reducing agent in this step. The reducing agent is contacted with the calcined catalyst at conditions including a temperature of about 800° to about 1100°F. and a liquid hourly gas velocity of about 100 to about 5000 hr.$^-$ selected to reduce substantially all of the platinum or palladium component and iridium component to the corresponding metallic states. This prereduction step may be performed in situ as part of a start-up sequence if precautions are taken to predry the plant to a substantially water-free state and if substantially water-free hydrogen is used.

The resulting reduced catalytic composite may, in some cases be beneficially subjected to a presulfiding step designed to incorporate in the catalytic composite from about 0.05 to about 0.5 wt. % sulfur, calculated on an elemental basis. Preferably, this presulfiding treatment takes place in the presence of hydrogen and a suitable sulfide-producing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of sulfur, generally including a temperature ranging from about 50° up to about 1000°F. It is generally a good practice to perform this presulfiding step under substantially water-free conditions.

In some embodiment of the present invention, the catalyst that is regenerated thereby will contain a sulfur component. Typically the major portion of this sulfur comes from sulfur or sulfur-containing compounds which are present in the charge stock or from the deliberate injection of sulfur into the hydrocarbon conversion process or from inadvertent upsets of upstream treating facilities or from any of the other sources well known to those skilled in this art. Regardless of the source, it is within the scope of the instant method to regenerate catalysts contianing about 0.01 to about 5 wt. % or more sulfur, with this amount being more commonly about 0.05 to about 1 wt. %, calculated on a carbon-free and elemental sulfur basis.

In one preferred embodiment, the catalyst regenerated by the present invention is a combination of a platinum component, a chlorine component, an iridium component and a sulfur component with an alumina carrier material. These components are typically present in amounts sufficient to result in a catalyst containing, on an elemental and carbon-free basis, about 0.1 to about 3.5 wt. %, chlorine, about 0.01 to about 2 wt. % platinum, about 0.01 to about 2 wt. % iridium and about 0.05 to about 1 wt. % sulfur.

The principal utility of the subject acidic, bimetallic catalyst is in a hydrocarbon conversion process wherein a dualfunction hydrocarbon conversion catalyst having a hydrogenation-dehydrogenation function and an acid-acting function has been traditionally used; for example, these catalysts are used in a reforming process with excellent results. In a typical reforming process, a hydrocarbon charge stock boiling in the gasoline range and hydrogen are contacted with the catalyst of the type described above in a conversion zone at reforming conditions. The hydrocarbon charge stock will typically comprise hydrocarbon fractions containing naphthenes and paraffins that boil within the gasoline range. The preferred class of charge stocks include straight run gasolines, natural gasolines, synthetic gasolines, etc. The gasoline charge stock may be a full boiling range gasoline having an initial boiling point of about 50° to about 150° F., and an end boiling point within the range of about 250° to 425° F., or it may be a selected fraction thereof which generally will be a higher boiling fraction commonly referred to as a heavy naphtha—for example, a naphtha boiling in the range of $C_7$ to 400° F. provides an excellent charge stock. In general, the conditions used in the reforming process are: a pressure of about 50 to about 1000 psig., with the preferred pressure being 100 to about 600 psig.; a temperature of about 800 to about 1100° F., and preferably about 900 to about 1050° F.; a hydrogen to hydrocarbon mole ratio of about 2 to about 20 moles of $H_2$ per mole of hydrocarbon, and preferably about 4 to about 10 moles of $H_2$ per mole of hydrocarbon; and a liquid hourly space velocity (which is defined as the equivalent liquid volume flow rate per hour of the hydrocarbon charge stock divided by the volume of the bed of catalyst particles) of about 0.1 to about 10 hr.$^-$, with a value in the range of about 1 to about 3 hr.$^-$ giving best results.

When the acidic, bimetallic catalysts of the type described above are employed in the conversion of hydrocarbons, particularly the reforming process outlines above, the activity, selectivity and stability of these catalysts are initially quite acceptable. For example, in a reforming process this type of catalyst has several singular advantages, among which are increased $C_5+$ yield, decreased rate of coke laydown on the catalyst, increased hydrogen make, enhanced stability of both $C_5+$ yield and temperature necessary to make octane, and excellent catalyst life before regeneration becomes necessary. However, the gradual accumulation of coke and other deactivating carbonaceous deposits on the catalyst will eventually reduce the activity and selectivity of the process to a level such that regeneration is desirable. Ordinarily, regeneration becomes desirable when about ½ to about 25 percent by weight of carbonaceous deposits have been formed upon the catalyst.

When the performance of the catalyst has decayed to the point where it is desired to regenerate the catalyst, the introduction of the hydrocarbon charge stock into the conversion zone containing the catalyst is stopped or the catalyst is withdrawn from the conversion zone on a continuous or intermittent basis without stopping the conversion operation. Thereafter, the regeneration method of the present invention is performed either in situ or the catalyst may be unloaded from the conversion zone if it has not been removed during processing, and regenerated in an off-line facility. It is to be noted that the scope of the method of the present invention includes two distinct modes of operation depending on whether or not the deactivated catalyst contains labile sulfur. If it does, it is essential that a sulfur-stripping step be performed before any of the coke is removed from the deactivated catalyst. On the other hand, if it does not, this sulfur-stripping step may be omitted. In either case, it is an essential feature of the subject regeneration method that the composition of the gas streams used in the various steps are carefully controlled. In particular, it is a critical feature of the present invention that the gas stream used during the sulfur-stripping step, the carbon-burning step, the oxygen-treating step, and the reduction step are substantially free of compounds of sulfur—particularly, oxides of sulfur and $H_2S$. It is, therefore, evident that the gas streams used in each of the steps of the present invention may be once-through streams or recycle streams; provided that in this latter case, the recycle streams are treated by conventional techniques to insure the absence of detrimental sulfur constituents. Furthermore, it is to be noted that the temperatures given hereinafter for each of the steps refer to the temperature of the gas stream used therein just before it contacts the catalyst, and that the composition of the gas streams utilized refer to the input gas stream and are given in mole percent, which are, of course, substantially the same as when expressed in volume percent.

When the deactivated bimetallic catalyst contains labile sulfur, the first step of the regeneration method involves subjecting the deactivated catalyst to contact with a substantially sulfurfree hydrogen stream at conditions selected to strip labile sulfur from the catalyst and associated hardware of the hydrocarbon conversion plant. The term "labile sulfur" is used here to mean the sulfur contained in the catalyst that can be removed by hydrogen stripping. This hydrogen stream preferably contains $H_2O$ and HCl in amounts, respectively, sufficient to result in a mole ratio of $H_2O$ to HCl of about 5:1 to about 100:1, with best results ordinarily obtained at a mole ratio of about 10:1 to about 70:1. In general, when the hydrogen stream contains $H_2O$ and HCl it is preferred to operate with a relatively minor amount of water in this hydrogen stream, with best results obtained when the amount of water contained therein is sufficient to comprise about 0.5 to about 2 mole percent thereof, although in some cases higher amounts of water may be utilized if the restriction given above with respect to mole ratio is observed. Accordingly, in a preferred mode of operation, this hydrogen stream consists essentially of a hydrogen stream containing about 0.5 to about 2 mole percent water and about 0.005 to about 0.1 mole percent HCl. It is to be noted, both here and in the subsequent steps, that when reference is made to HCl being contained in the gas streams, it is intended to include both the situation where HCl per se is added to the gas streams and where a chlorine-containing substance, which is convertible to hydrogen chloride under the conditions utilized in these steps, is added to these gas streams Examples of these substances are chlorine, alkyl chlorides, carbon tetrachloride and the like compounds. This sulfur-stripping step is preferably conducted at a relatively high temperature of about 350° to about 600° C., with best results obtained at about 400° to 550° C. Similarly, the pressure utilized is preferably about 1 to about 50 atmospheres, with best results obtained when a relatively high pressure is utilized in conjunction with a relatively high temperature. Likewise, the gas hourly space velocity can be selected from a relatively broad range of about 100 to 25,000 hr.$^-$ This sulfur-stripping step is performed for a period extending until the resulting effluent gas stream is substantially free of hydrogen sulfide; that is, less than about 10 vol. ppm. and preferably less than 1 vol. ppm. The hydrogen stream utilized in this step can be a once-through stream or a recycle stream, provided, in the latter case, that suitable arrangements are made to remove substantially all $H_2S$ from the recirculated gas stream. An acceptable removal procedure, both here and in subsequent step, involves, for example, contacting the effluent gas stream withdrawn from the zone containing the deactivated catalyst with a strong basic solution such as an aqueous solution of an alkali metal or alkaline earth salt of a weak acid. A preferred scrubbing procedure involves scrubbing with a solution of sodium hydroxide or sodium carbonate which is maintained at a pH of about 7 to 11. In a commercial hydrocarbon conversion plant, this scrubbing operation can easily be performed by circulating a basic solution from the hydrogen separator to the inlet to the reactor effluent cooling means with suitable addition of fresh solution and withdrawal of spent solution to maintain the desired pH level.

This labile sulfur-stripping step is to be sharply distinguished from the conventional volatile hydrocarbon-stripping step which is ordinarily performed during the shutdown procedure when the catalyst has deactivated and is taken off stream. It is customary for platinum metal-containing catalysts to perform this volatile hydrocarbon-stripping step with a hydrogen-containing stream; however, the function of this last stripping step is to remove volatile hydrocarbons and it is terminated when the effluent gas stream becomes free of same. Thus, the conventional stripping step is ordinarily completed in about 0.5 to about 2 hours. In sharp contrast, the sulfur-stripping step required by the present invention lasts until the effluent gas stream is substantially free of hydrogen sulfide, which is ordinarily a much longer period of about 15 to 30 or more hours, depending upon the exact stripping conditions utilized and the amount of labile sulfur initially on the catalyst.

Although it is not particularly preferred, alternative mode of operation of this sulfur-stripping step involves contacting a substantially sulfur-free mixture of hydrogen and charge stock with the sulfur-containing catalyst at conditions selected to convert hydrocarbons and to strip labile sulfur. This contacting is usually performed with recycle gas scrubbing, as explained hereinbefore, for a period of time extending until the effluent stream from this contacting step is substantially free of hydrogen sulfide; that is, less than about 10 vol. ppm. and preferably less than 1 vol. ppm.

It is to be understood that, if the catalyst is regenerated in situ in a plant that has been exposed to sulfur, it is generally a preferred practice to burn sulfide scale from the plant hardware prior to this sulfur-stripping step. In particular, the sulfide scale should be at least removed from the charge heater as this is the point of maximum accumulation of sulfur when it is introduced in the charge stock. This sulfide scale-burning step, at the minimum, should be conducted at a temperature and $O_2$ cncentration which are more severe than any subsequently encountered during the regeneration procedure.

Following this sulfur-stripping step, residual hydrogen is removed from contact with the resulting labile sulfur-free catalyst by purging with an inert gas such as nitrogen. A preferred mode of operation for this purging step involves use of an inert gas stream that contains $H_2O$ and HCl in a mole ratio of about 5:1 to about 100:1.

After hydrogen is purged from contact with the labile sulfur-free catalyst, the next step involves burning carbon or coke from the resulting catalyst. This involves subjecting the deactivated catalyst to contact with a substantially sulfur-free first gaseous mixture containing oxygen, $H_2O$ and HCl at carbon-burning conditions. Preferably, the amount of oxygen contained in this first gaseous mixture is maintained within the range of about 0.2 to about 3 mole percent thereof, with best results obtained when it is about 0.5 to about 1.5 mole percent thereof. Similarly, it is necessary to maintain the mole ratio of $H_2O$ to HCl contained in this first gaseous mixture within the range of about 5:1 to about 100:1, with best results obtained at a ratio of about 10:1 to about 70:1. In addition, the amount of water contained in this first gaseous mixture preferably comprises about 0.5 to about 2 mole percent thereof. The balance of the gaseous mixture is an inert gas such as nitrogen, helium, carbon dioxide, etc. The conditions utilized in this carbon-burning step are: a temperature of about 375 to about 450° C., a pressure sufficient to maintain the flow of this second gaseous mixture through the zone containing the catalyst and preferably about 1 to about 30 atmospheres, and a gas hourly space velocity (defined as the volume rate of flow of the gas stream per hour at standard conditions divided by the volume of the catalyst bed) of about 100 to about 25,000 hr.$^-$. This carbon-burning step is performed for a time period sufficient to substantially remove carbonaceous materials from the catalyst. In general, depending obviously upon the amount of carbonaceous materials initially present on the catalyst, a carbon-buring period of about 5 to about 30 or more hours is adequate, with best results typically obtained in about 20 to about 30 hours. A convenient criterion for determining when this carbon-burning step is essentially complete involves monitoring the differential temperature across the reactor containing the catalyst, when this parameter is less than about 5° C. then the carbon-burning step for this reactor can be considered finished. For a multi-reactor system, the beds of the catalyst are preferably regenerated seriatim with the differential temperature across the last reactor in series being the controlling parameter.

The next essential step of the present regeneration method involves treating the catalyst resulting from the carbon-burning step with a substantially sulfur-free second gaseous mixture containing $O_2$, $H_2O$ and HCl for a period of about 0.5 to about 10 hours at a relatively high temperature. This second gaseous mixture contains $O_2$ in an amount of about 0.2 to about 25 mole % thereof, with a value of about 1 to 5 being preferred. Likewise, it contains $H_2O$ and HCl in a mole ratio of $H_2O$ to HCl of about 5:1 to about 100:1, with best results obtained at a mole ratio of about 10:1 to about 70:1. The temperature utilized in this second step is selected from the range of about 4502 to about 550° C. The other conditions are preferably selected from the ranges previously given in the discussion of the carbon-burning step. A preferred mode of operation of this step involves conducting this treatment in two substeps: the first substep involves treating the catalyst resulting from the carbon-burning step with the first gaseous mixture for a period of about 0.5 to about 5 hours at a temperature of about 450° to about 550° C. The second substep then involves increasing the amount of oxygen contained in the first gaseous mixture by a factor of about 1.5 to about 8 and thereafter continuing the treating with this second gaseous mixture for a period of about 0.5 to about 5 hours at the same temperature as utilized in the first substep. Another preferred mode of operation of this treatment step involves, in the first substep, increasing the amount of $O_2$ contained in the first gaseous mixture by a factor of about 1.5 to about 8, preferably about 2, to form the second gaseous mixture and treating the catalyst resulting from the carbon-burning step with this second gaseous mixture at a temperature of about 375° to about 450° C. for about 0.5 to about 5 hours. Thereafter, in the second substep, the resulting catalyst is treated with this second gaseous mixture at a temperature of about 450° to about 550° C. for an additional period of about 0.5 to about 5 hours. The function of this oxygen-treating step is to remove trace amounts of carbonaceous materials which were not burned off during the first step and to convert the metallic components of the catalyst (i.e., the platinum or palladium and iridium components) to a highly oxidized and dispersed state.

After this oxygen-treating step, oxygen is purged from contact with the resulting catalyst by means of a suitable inert gas stream. In view of the fact that the subsequent reduction step is conducted under a wet condition, it is not necessary to dry the plant during this step. All that is necessary it to displace oxygen from contact with the catalyst, and the period of time necessary to do this can easily be determined by monitoring the effluent gas stream from the zone containing the catalyst.

Upon completion of this last purge step, the final essential step of the regeneration method is commenced. It involves contacting the oxygen-treated catalyst with a substantially sulfur-free third gaseous mixture comprising hydrogen, $H_2O$ and HCl at a temperature of about 300° to about 6002 C., with best results obtained at a relatively low temperature of 325° to 425° C., for a final period of about 0.5 to about 5 hours. The amounts of $H_2O$ and HCl in this third gaseous mixture are selected so that the mole ratio of $H_2O$ to HCl is about 5:1 to about 500:1, and preferably about 5:1 to about 100:1, with best results obtained at about 10:1 to about 70:1. Siimilarly, the amount of $H_2O$ contained in this third gaseous mixture is preferably about 0.5 to about 2 mole percent thereof. In many cases, it is beneficial to conduct this reduction step in two substeps: the first involving a relatively low partial pressure of $H_2$ of about 0.5 to about 2 atmospheres, and the second involving a relatively high partial pressure of $H_2$ of about 5 to about 10 atmospheres. Once again, the pressure and gaseous flow rates utilized for this step are preferably identical to those given in conjunction with the discussion of the carbon-burning step. The purpose of this reduction step is to reduce substantially all of the platinum or palladium and iridium components of the catalyst to the corresponding elemental state while maintaining the halogen component in an active state, thereby producing a regenerated bimetallic catalyst having activity, selectivity and stability characteristics comparable to those possessed initially by the fresh catalyst.

Following this reduction step, the regenerated, acidic bimetallic catalyst may be returned by suitable means to the hydrocarbon conversion zone if it has been regenerated ex situ. If the regeneration was performed in situ, the hydrocarbon conversion process in which the catalyst is utilized may be restarted by once again charging the hydrocarbon stream in the presence of hydrogen to the zone containing the regenerated catalyst at conversion conditions designed to produce the desired product. In the preferred case, this involves re-establishing reforming conditions within the zone containing the catalyst. In many cases, it is advantageous to dry the regenerated catalyst by stripping water therefrom at an elevated temperature before the process is restarted—for example, the regenerated catalyst can be contacted with a water-free hydrogen stream at 400° C. for about 1 hour.

It is intended to cover by the following claims all changes and modifications of the regeneration procedure disclosed herein that would be self-evident to someone of ordinary skill in the catalyst regeneration art.

I claim as may invention:

1. A method for regenerating a deactivated hydrocarbon conversion catalyst comprising a labile sulfur-free combination of a refractory inorganic oxide carrier material, chlorine and a metallic component consisting essentially of catalytically effective amounts of platinum, palladium or mixtures thereof and iriduim, said catalyst containing on an elemental and carbon-free basis, about 0.01 to about 2 wt. % platinum or palladium, about 0.01 to about 2 wt. % iridium and about 0.1 to about 3.5 wt. % chloringe the catalyst having been deactivated by the deposition of carbonaceous materials thereon during a previous contacting with a hydrocarbon charge stock at hydrocarbon conversion conditions, said method comprising the sequential steps of:

a. contacting the deactivated catalyst with a substantially sulfur-free first gaseous mixture containing $O_2$, $H_2O$ and HCl—the amount of $O_2$ being about 0.2 to about 3 mole % thereof and the mole ratio of $H_2O$ to HCl contained therein being selected from the range of about 5:1 to about 100:1—at a temperature of about 375° to about 450° C. for a period sufficient to substantially remove said carbonaceous materials;

b. treating the catalyst resulting from step (a) by contacting it with a substantially sulfur-free second gaseous mixture containing $O_2$, $H_2O$ and HCl—the amount of $O_2$ being about 0.2 to about 25 mole % thereof and the mole ratio of $H_2O$ to HCl contained therein being selected from the range of about 5:1 to about 100:1—at a temperature of about 450° to about 550° C. for a period of about 0.5 to about 10 hours;

c. purging oxygen from contact with the catalyst from step (b); and, d. subjecting the catalyst resulting from step (c) to contact with a substantially sulfur-free third gaseous mixture comprising hydrogen, $H_2O$ and HCl—the mole ratio of $H_2O$ to HCl being selected from the range of from about 5:1 to about 500:1—at a temperature of about 300° to 600° C. for a final period of about 0.5 to about 5 hours, thereby producing a regenerated hydrocarbon conversion catalyst having activity, selectivity and stability characteristics comparable to those possessed initially by the fresh catalyst.

2. A method as defined in claim 1 wherein the platinum or palladium of the catalyst is platinum metal.

3. A method as defined in claim 1 wherein the platinum or palladium of the catalyst is palladium metal.

4. A method as defined in claim 1 wherein the refractory inorganic oxide carrier material is alumina.

5. A method as defined in claim 1 wherein the mole ratios of $H_2O$ to HCl utilized in steps (a), (b) and (d) are selected from the range of about 10:1 to about 70:1.

6. A method as defined in claim 1 wherein the temperature utilized in step (d) is about 325° to about 425° C.

7. A method as defined in claim 1 wherein step (b) comprises the substeps of:
1. treating the catalyst resulting from step (a) with a first gaseous mixture for about 0.5 to about 5 hours at a temperature of about 450° to about 550° C.; and, thereafter
2. increasing the amount of $O_2$ contained in said first gaseous mixture by a factor of about 1.5 to about 8 and continuing the treating for an additional period of about 0.5 to about 5 hours at the same temperature as utilized in substep (1).

8. A method as defined in claim 1 wherein step (b) comprises the substeps of:
1. increasing the amount of $O_2$ contained in the first gaseous mixture by a factor of about 1.5 to about 8 to form the second gaseous mixture and treating the catalyst resulting from step (a) with this second gaseous mixture at a temperature of about 375° to about 450° C. for about 0.5 to about 5 hours; and, thereafter
2. treating the resulting catalyst with the second gaseous mixture at a temperature of about 450° to about 550° C. for an additional period of about 0.5 to about 5 hours.

9. A method as defined in claim 1 wherein the amount of oxygen contained in the first gaseous mixture is about 0.5 to about 1.5 mole %.

10. A method as defined in claim 1 wherein the amount of oxygen contained in the second gaseous mixture is about 1 to about 5 mole %.

11. A method as defined in claim 1 wherein the period utilized in step (a) extends until the differential temperature across the catalyst bed is less than 5° C.

* * * * *